April 16, 1946.    F. A. FIRESTONE    2,398,701
SUPERSONIC INSPECTION DEVICE
Filed June 29, 1942    3 Sheets-Sheet 1
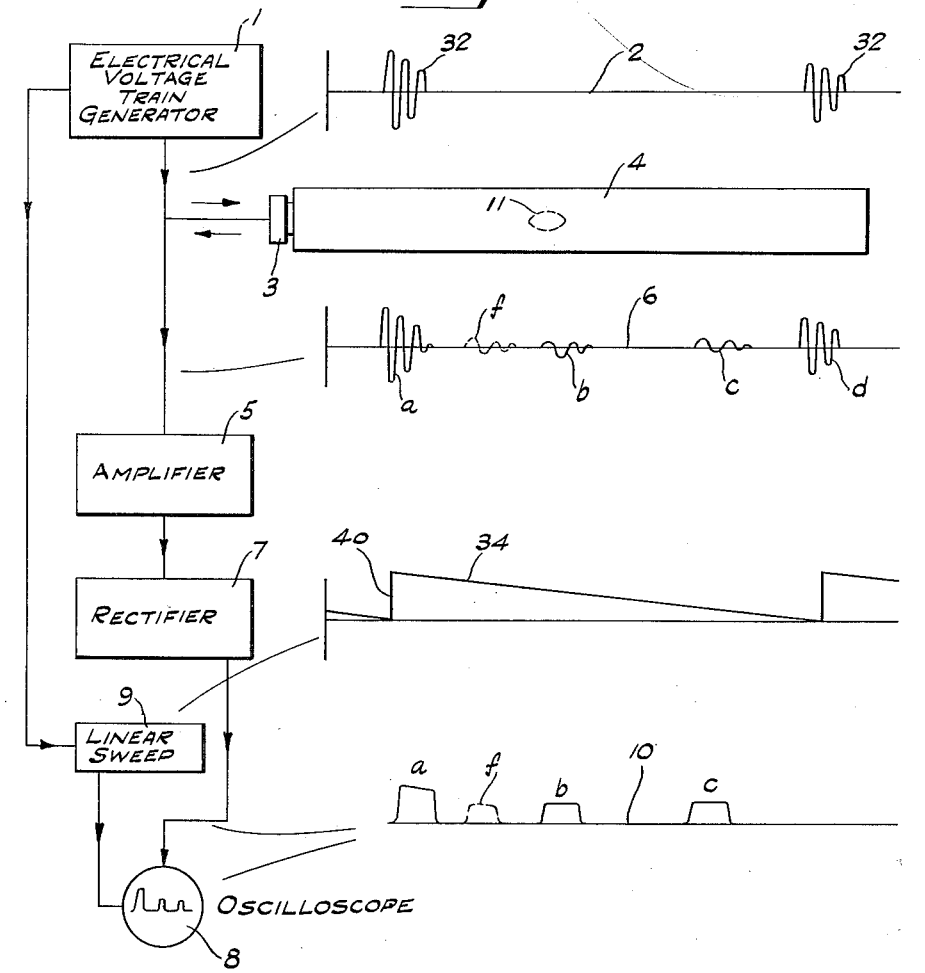
INVENTOR
Floyd A. Firestone.
BY
Harris G. Luther
ATTORNEY April 16, 1946.  F. A. FIRESTONE  2,398,701
SUPERSONIC INSPECTION DEVICE
Filed June 29, 1942   3 Sheets-Sheet 2
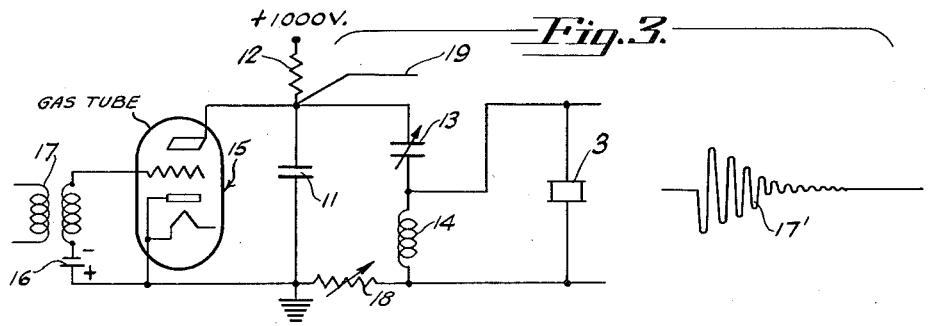
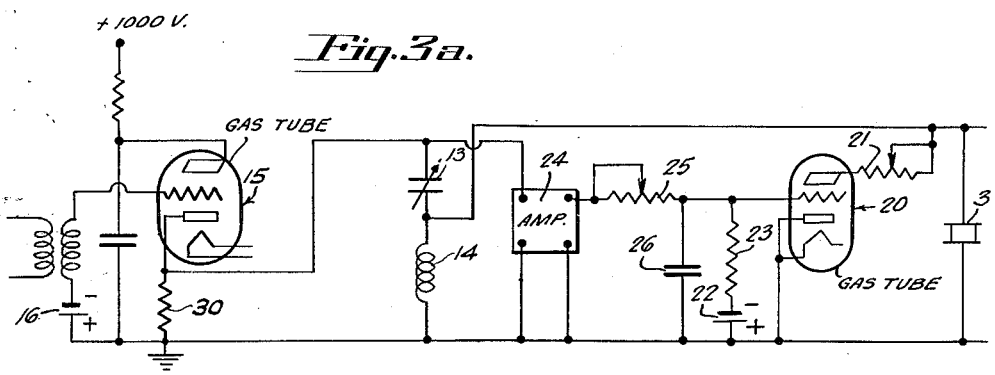
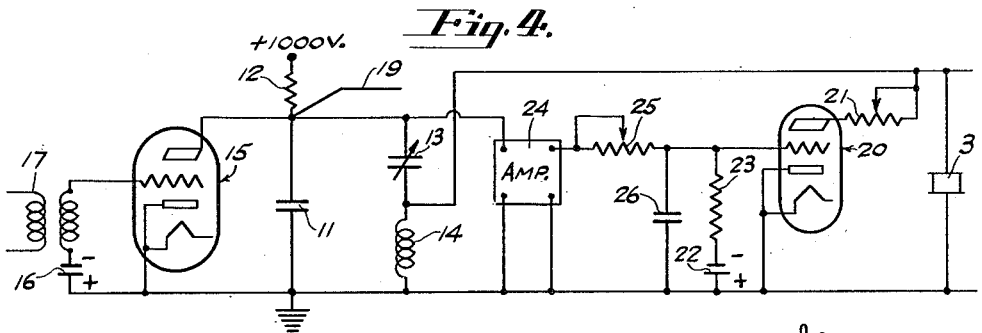
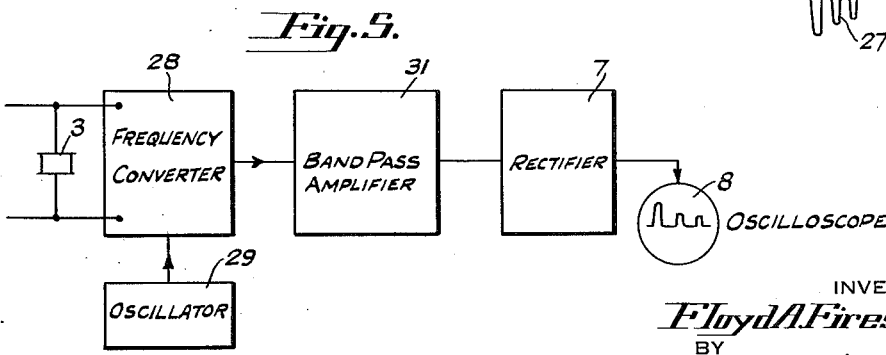
INVENTOR
Floyd A. Firestone.
BY Harris G. Luther
ATTORNEY April 16, 1946.　　　F. A. FIRESTONE　　　2,398,701
SUPERSONIC INSPECTION DEVICE
Filed June 29, 1942　　　3 Sheets-Sheet 3

Inventor:
FLOYD A. FIRESTONE
By Charles L. Shelton
Attorney

Patented Apr. 16, 1946

2,398,701

UNITED STATES PATENT OFFICE 2,398,701

SUPERSONIC INSPECTION DEVICE

Floyd A. Firestone, Ann Arbor, Mich., assignor to United Aircraft Corporation, East Hartford, Conn., a corporation of Delaware Application June 29, 1942, Serial No. 448,983

32 Claims. (Cl. 73—67)

My invention relates to improvements in the electrical circuits used in producing and detecting the wave trains utilized by a supersonic inspection device of the type described and claimed in my United States Patent No. 2,280,226, entitled "Flaw detecting device and measuring instrument." The general principle of that device consists in generating an electrical voltage "train" consisting of only a few cycles of alternating high frequency voltage; this voltage train is applied to a quartz crystal attached to a part to be inspected and a high frequency vibration wave train is radiated into the part; later, this wave train is reflected back to the same or another quartz crystal by a flaw or the opposite boundary of the part and the reflected wave train generates an electrical wave train in the crystal, which is amplified and indicated on a cathode ray oscilloscope whose spot was started sweeping at the instant the original wave train was sent out; by this means the time interval occupied by the travel of the wave train can be determined and if any reflection arrives at the crystal sooner than the reflection from the distant boundary, it may be ascribed to some inhomogeneity or flaw within the part. This whose process is repeated periodically, say, sixty times per second, so that persistence of vision may be utilized to increase the brilliancy of the image on the oscilloscope, and to render the method direct and continuously indicating.

The purpose of the present invention is to provide an improved means for the generation of a high frequency high voltage wave train with simplified apparatus and in such a manner that the individual waves are synchronized with their amplitude envelope and with the sweeping of the oscilloscope spot, to the end that the pattern observed on the oscilloscope screen is completely stationary.

A further purpose of my invention is to provide means for the simple control of the number of cycles within each electrical wave train as generated, said control to function so as to retain the synchronization between the individual waves, their amplitude envelope, and the sweeping of the oscilloscope spot.

A further purpose of my invention is to provide a sensitive amplifier that can be connected to the quartz crystal which is energized by the high voltage electrical voltage train, which amplifier shall within approximately a millionth of a second recover its sensitivity so that it may be sensitive to the feeble voltage trains generated by the crystal when feeble wave trains are reflected back to it from flaws distant only a fraction of an inch from the sending point and which reflected wave trains therefore arrive back at the sending point within approximately a millionth of a second after the sending out of the initial wave train.

Other objects of my invention will become evident upon reading the remainder of the specification and claims below.

Fig. 1 shows in block schematic form the general layout of apparatus for applying my invention.

Fig. 2 shows two voltage trains in which the individual waves are not synchronized with their amplitude envelope.

Fig. 3 shows one form of voltage train generator which generates individual oscillations which are always produced in the same phase relative to their envelope.

Fig. 3a shows an alternative form of voltage train generator.

Fig. 3c shows a modification of the voltage train generator of Fig. 3a.

Fig. 4 shows a more advanced form of voltage train generator which is capable of producing large amplitude voltage trains of very short time duration.

Fig. 5 shows in block schematic form the heterodyne amplifier used.

Figure 3B:
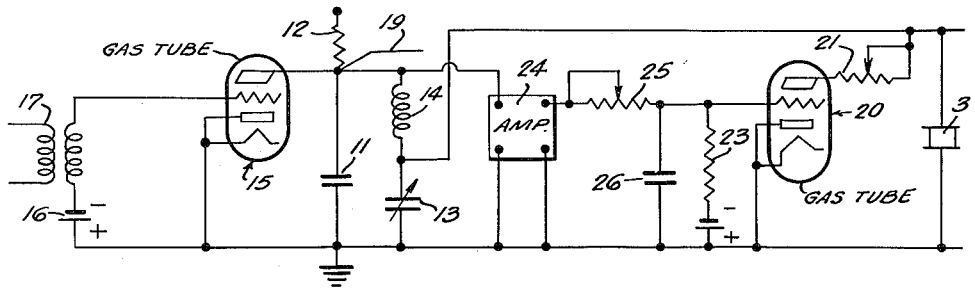
Fig. 3b shows a modification of the voltage train generator of Figs. 3 and 4.

Since the present invention is an improvement of my aforementioned invention described in my United States Patent No. 2,280,226 the reader is referred to that specification for full details of the general method of detecting flaws in solid parts by means of supersonic waves. This general method with slight modifications is reviewed in Fig. 1. The electrical voltage train generator 1 generates a voltage train 32 as shown in the graph 2 of Fig. 1. Each voltage train 32 as shown consists of two and one-half cycles of a high frequency, say, five megacycles per second, and is followed by a long interval when no voltage is generated. These voltage trains 32 are generated periodically, say, sixty times per second, and their maximum instantaneous voltage may be of the order of magnitude of one thousand volts. These voltage trains 32 are applied to the coatings of a quartz crystal 3 having a natural frequency approximately the same as the frequency of the generated voltage trains 32 of perhaps five megacycles per second and which is attached, by suitable means such as a film of oil, to the part 4 to be inspected. The quartz crystal excited by the voltage train impressed thereon radiates a mechanical vibration wave train into the part consisting of perhaps three or four cycles of vibration at the high frequency (the number of cycles in the train being somewhat increased by the free vibration of the crystal) which wave train is reflected from the distant boundary of the part and returns to the crystal causing it to vibrate and generate a voltage train, of maximum value a fraction of a volt, in response to the received vibration. The crystal is connected to the amplifier 5 which therefore receives voltage trains as shown in graph 6 of Fig. 1; here "a" is the large original voltage train 32 received directly from the voltage train generator; "b" is the voltage train generated through the quartz crystal by the vibration wave train as first reflected back to the crystal; "c" is the voltage train generated through the quartz crystal by the vibration wave train which has been reflected from the crystal end of the part and has made another round trip to the distant end of the part and back, there being a whole series of equally timed voltage trains due to such successive reflections. If the part 4 is of aluminum and one inch long, the time interval between "a" and "b" and "c," etc., will be eight millionths of a second (eight micro-seconds). "d" represents the next voltage train 32 sent out by the voltage train generator and if this is one-sixtieth of a second later as suggested above, there will be sixteen thousand six hundred and sixty-six microseconds from "a" to "d"; thus the successive reflections "b," "c," etc., have ample time to die out before the next wave train is emitted. The output of the amplifier may or may not be rectified by a rectifier 7 whose output is fed to the vertical plates of a cathode ray oscilloscope 8. The horizontal motion of the oscilloscope spot indicated by the line 34 is produced by any well known device such as a linear sweep circuit 9, multivibrator, or Puckle circuit; in its simplest form, the sweep circuit is connected with the voltage train generator in such a manner that the oscilloscope spot is returned to the left side of the screen at the instant that the initiating voltage train is generated and the spot then sweeps toward the right with a constant speed of, say, one-tenth of an inch per microsecond so that the initial and successive reflections are shown on the screen of oscilloscope 8 as in the enlarged view of the trace shown in graph 10. Here "a" is the initial impulse produced by voltage train 32 while "b" and "c" are impulses produced by successive reflections of that voltage train. If now the part 4 contains a flow 11 there will be a reflected wave train back to the crystal 3 before the first reflection "b" arrives from the distant boundary of the part. This produces a wave train "f" in graph 6 and an impulse which will produce an indication "f" in graph 10 on the oscilloscope screen. The distance from the crystal 3 to the flaw 11 or the distant boundary of the part may be determined by observing the spacing "a" to "f" or "a" to "b" in graph 10 in comparison with a set of time signals superimposed on the trace (not shown). The time signals may be produced by a means as disclosed in my copending application Serial No. 479,228, filed March 15, 1943.

If the part 4 is many feet long and the flow 11 is several feet away, one can tolerate time delays or irregularities in the operation of the various parts of this system, of as much as ten microseconds. When, however, the part is only an inch long and the first reflected wave train from the distant boundary arrives only eight microseconds after being sent out, a number of conditions must be fulfilled in the design of the apparatus or no reflections whatever can be observed.

1. The electrical voltage train generator 1 must supply a high voltage high frequency voltage train of extremely short total time duration, preferably one microsecond or less. Although the maximum instantaneous voltage in the voltage train may be of the order of one thousand volts, there must not be any transients or after effects produced by the generator and following the voltage train, of as much as one-thousandth of a volt, as this generator is connected directly to the input of the amplifier which must be sensitive to voltage trains of the order of one-thousandth of a volt generated by the crystal due to the receipt of reflected wave trains in the part; any small spurious voltages following the initial voltage train show in the final record 10 as spurious reflections, or are often actually large enough to completely obliterate the indications due to the desired reflections. If the time duration of the voltage train is 1 microsecond, the wave train in aluminum will be one-fourth of an inch long.

Figure 6:
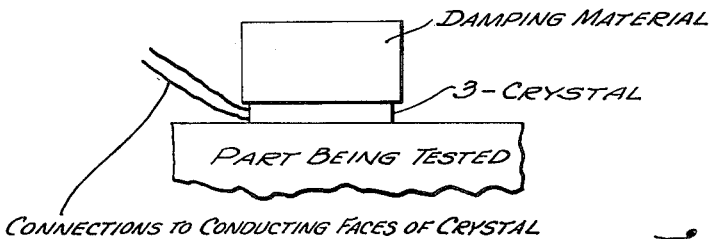
Fig. 6 shows in schematic form a crystal provided with a damping material.

2. The free vibration of the crystal 3 must be inhibited by damping means consisting usually in cementing the back of the crystal to a block of Bakelite, lead, or other material which absorbs high frequency waves instead of transmitting them, as shown in Fig. 6. If the free vibration is not damped, the mechanical vibration wave train sent into the part will contain many more cycles than the voltage train which initiated it, and the vibration wave train may be so long as to make it impossible to observe reflections in parts having small dimensions. In large dimensioned parts, however, a considerable free vibration of the crystal increases the sensitivity, so in any given part, the amount of damping to be used is a compromise between speed of indication and sensitivity in detecting small flaws.

3. The amplifier 5 must quickly recover its sensitivity to voltage of the order of one-thousandth of a volt after having been profoundly disturbed by the initiating voltage train of one thousand volts. It is always observed that with any type of amplifier, there is an interval following the application of the large initial voltage train to the amplifier input, during which the amplifier is "blocked" and has no sensitivity to voltages of the order of one-thousandth of a volt to which it might otherwise respond. In most amplifiers this blocking period is of the order of magnitude of one hundred micro-seconds which would keep one from observing reflections from any flaw closer to the sending point than 12 inches, a considerable disadvantage.

4. The amplifier 5 must not be sharply tuned but must pass a broad band of frequencies. If the amplifier output is to preserve as separate, input voltage trains following each other at intervals of five microseconds, the band width passed by the amplifier should be of the order of one-fifth of a megacycle; if the voltage trains follow each other at intervals of one microsecond, the band width of the amplifier must be of the order of one megacycle. Narrow band width amplifiers are in general more sensitive per stage, but they are inherently slower in their ability to resolve wave trains repeated at short time intervals.

5. If a rectifier 7 is used, its time constant must be short, of the order of one microsecond.

6. The synchronization of the sweep 9 and the voltage train generator 1 must be extremely accurate, preferably to one-tenth of a microsecond, otherwise the indications "a," "b," "c," etc., in graph 10 will be shaking back and forth horizontally as the process is periodically repeated, and will consequently be difficult to observe accurately.

7. The individual waves in the initial voltage train 32 must be synchronized with their envelope or the indications "a," "b," "c," etc., in graph 10 will be shaking up and down and will be difficult to observe. Fig. 2 shows two wave trains 36 and 38 having the same envelope but in which the individual waves, while being of the same frequency in both cases, are in different phases relative to the envelope. Such a condition is apt to obtain when the voltage trains are obtained from an oscillator which is modulated. The deleterious effect of this condition upon the steadiness of the indications is most pronounced when short wave trains are used and the total number of waves within the wave train is a minimum.

My invention consists in the combination of elements meeting the above conditions. With my device the first reflection from a flaw one-half of an inch away may be observed, and successive reflections obtained in a plate one-sixteenth of an inch thick. My invention also consists in certain improved elements meeting the above conditions.

An important improved element is the voltage train generator of which a preferred form is shown in simplified form in Fig. 3. A condenser 11 is normally charged to a potential of about one thousand volts through the high resistor 12 of the order of one megohm. Condenser 11 is shunted by a circuit consisting of a variable condenser 13 in series with an inductance 14. Condenser 11 is also shunted by a grid controlled discharge tube such as a gas filled triode generally indicated at 15 which may be RCA type 884. The grid of triode 15 is normally held so far negative by battery 16 that the triode is non-conducting; however, when a sixty cycle impulse is impressed on the grid through transformer 17, the grid becomes sufficiently positive that the tube suddenly becomes conducting, abruptly discharging condenser 11 and causing circuit 13, 14, 11 (or 15), to oscillate with an exponentially damped oscillation so that a voltage train indicated at 17' is generated across inductance 14. The crystal 3 is connected across inductance 14 and therefore is energized by this voltage train. A wire 19 from the high voltage side of condenser 11 leads to the synchronizing terminal of the sweep circuit and serves to provide a large impulse to the sweep circuit exactly at the instant when the oscillations in the wave train begin, so that the oscilloscope spot is returned to the left as indicated at 40 in Fig. 1 and starts sweeping to the right at this instant. (It is not necessary to describe the sweep circuit in detail since this is a well known article of commerce.) The frequency of the oscillations is mainly determined by the magnitude of inductance 14 and the setting of condenser 13 (condenser 11 being usually considerably larger than 13) so that the generator may be tuned at or near the natural frequency of crystal 3. Gas triode 15 remains conducting for about twenty-five microseconds and then ceases to conduct, whereupon condenser 11 charges comparatively slowly through resistor 12 and is ready to repeat the process one-sixtieth of a second later. It will be noted that when the discharge is repeated, the oscillatory waves produced will be in the same phase as before, relative to their exponential envelope, and will again appear exactly as shown in graph 17'. The amount of damping of this exponentially decaying oscillation is determined by the amount of resistance in the circuit 13, 14, 11 and the voltage train can be shortened by adding resistance in series with this circuit, as shown at 18 in Fig. 3.

In any exponentially decaying voltage train a considerable fraction of the energy resides in the first few cycles of the oscillation and a better way to shorten the train is to encourage oscillation with as little damping as possible, and then to abruptly cut off the remaining oscillations. A circuit for doing this is shown in Fig. 4. The left portion of this circuit is the generating portion and is exactly the same in structure and function as the circuit of Fig. 3, and the analogous parts are numbered the same. The crystal 3 is connected across the inductance 14 as before but there is an additional gas triode generally indicated at 20 and adjustable resistor 21 connected in series across the crystal as shown. The grid of triode 20 is biased sufficiently negative by the battery 22 acting through the high resistance leak 23 that the tube is normally non-conducting. The grid of gas triode 20 is actuated by a one stage amplifier 24 whose function is to apply a positive impulse to the grid of gas triode 20 in response to the negative impulse which amplifier 24 receives due to the abrupt discharge of condenser 11; thus the function of amplifier 24 is merely to serve as a phase inverter and without drawing any appreciable current from the circuit 11, 13, 14. Between amplifier 24 and the grid of gas triode 20 lies the time delay circuit consisting of variable series resistor 25 and shunt condenser 26.

The operation of the circuit of Fig. 4 is as follows: When condenser 11 is suddenly discharged and the circuit 11, 13, 14, set into oscillation the grid of amplifier 24 is suddenly sent negative beyond plate current cutoff and the upper plate of condenser 26 grows less negative at a rate determined by the value of resistor 25. The grid of tube 20 finally reaches a potential sufficiently less negative that at an instant when its plate is positive, the tube becomes conducting, and the oscillation can be completely brought to zero amplitude within a half period. The resulting wave train is as shown at 27 in Fig. 4, consisting of an initial portion having an exponential decay, but terminating abruptly. By adjusting resistor 21 this cutoff of the decay can be adjusted to take place within the half period without transient oscillations. The tube 20 remains conducting for about twenty-five microseconds and thereby cuts down the sensitivity of the crystal in generating voltage trains in response to reflected wave trains during this interval; if, however, the size of resistor 21 is increased, the sensitivity of the circuit is increased although the cutoff of the damped voltage train is less abrupt. A best compromise value for resistor 21 is quickly found by experiment. The time when the cutoff begins, or the number of cycles in the wave train, is determined by adjusting resistor 25. It will be noted that in this method of producing wave trains, the individual waves are in phase with their envelope, both at their beginning and end as well as throughout their central portion; oscilloscopic observations have shown this to be the case, and the reflection pattern as in graph 10 of Fig. 1 is completely stationary, even when repeated sixty times per second.

Figure 3C:
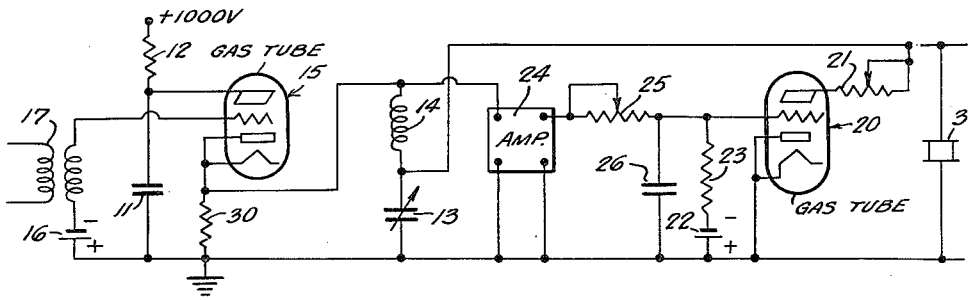

Several variations of the fundamental circuit of the voltage train generator of Fig. 3 are possible and may or may not be utilized in connection with the means shown in Fig. 4 for abruptly cutting off the exponentially decaying oscillation. Figs. 3a, 3b and 3c show fundamental circuit variations, and include the means shown in Fig. 4 for regulating the length of the voltage train. For instance, the inductance 14 and condenser 13 of Fig. 3 may be interchanged as shown in the circuit of Fig. 3b, the oscillatory voltage for the crystal 3 being taken off across the condenser 13 instead of across the inductance 14. The circuit may be further modified as shown in Fig. 3a. Here the condenser 11 is suddenly discharged through gas triode generally indicated at 15 which is in series with resistor 30; the condenser 13 and inductance 14 form an oscillatory circuit 13, 14, 30 and the oscillatory voltage for the crystal 3 is taken off across the inductance 14. In this circuit also, the condenser 13 and inductance 14 may be interchanged, as shown in Fig. 3c. In any of these embodiments, the frequency of the alternations in the wave train is approximately equal to $$f_r = 1/2\pi\sqrt{LC}$$

where L is the inductance of 14 in henries and C is the capacity of condenser 13 in farads. This assumes that condenser 11 has a considerably larger capacity than condenser 13. The period of the alternations is the reciprocal of the frequency.

The amplifier 5 of Fig. 1 must recover its sensitivity quickly after having been energized by the initial pulse of approximately one thousand volts. If the wave frequency is five megacycles and a conventional resistance capacity coupled amplifier is used, passing all frequencies up to, say, eight megacycles, the size of the coupling condensers necessary in order to pass such frequencies will be so great that after the receipt of the large impulse it will be many microseconds before the amplifier has recovered its sensitivity. If, on the other hand, the amplifier is of the heterodyne type, its blocking time can be made much shorter. For instance, in the block diagram of Fig. 5 the crystal 3 operating at, say, five megacycles is connected into a frequency converter 28 which is also energized by an oscillator 29 of frequency fifteen megacycles so that one of the sidebands lies at ten megacycles and will be amplified by the band pass amplifier 31 which amplifies throughout the frequency band eight to twelve megacycles. This in turn feeds the optional rectifier 7 and to the vertical plates of the oscilloscope 8. It is not necessary to detail the circuits of the frequency converter or band pass amplifier as these are well known elements used particularly in television; it is sufficient to point out that the band pass amplifier which handles higher frequencies than the crystal operating frequency can be designed with smaller condensers and with circuits which will have a much shorter blocking period than an amplifier which will pass the crystal frequency itself. Still faster recovery times can be secured through choosing an intermediate frequency for the amplifier of the order of twenty-five or fifty megacycles. The intermediate frequency amplifier of a conventional television receiver would in many cases be quite satisfactory for use as band pass amplifier 31 of Fig. 5. Such an amplifier is described, for instance, in a paper entitled, "Simplified television I-F systems," by Gerrard Mountjoy in RCA Review, volume 4, page 299; this amplifier passes the band from about 9 mc. to 12 mc. and would be suitable for use with supersonic wave trains having a frequency in the general neighborhood of 1 to 5 mc., the frequency converter 28 (which per se is known to the art) serving to change the 1 mc. to 5 mc. frequency of the voltage train developed when the vibration train is received by the crystal into a voltage train having a frequency within the 9 mc. to 12 mc. band passed by amplifier 31.

By combining a voltage train generator of the type described, with a damped crystal, and heterodyne amplifier having an intermediate frequency higher than the working frequency of the crystal, unusually good results are obtained in detecting flaws in parts of the order of magnitude of an inch in linear dimension, or in detecting flaws which lie within one-half of an inch of the sending point and from which the reflected wave train is received four microseconds after the initial wave train is sent out. The problem of the blocking of the amplifier is somewhat less serious when separate sending and receiving crystals are used, as disclosed in my United States Patent No. 2,280,226, but as a practical matter it is not possible to completely shield the high frequency high voltage electrical circuit of the sending crystal from the circuits of the receiving crystal, so that even with this arrangement it is desirable to employ an amplifier which has a rapid recovery after receiving a large voltage train.

The means employed for damping the free oscillations of the crystal 3 are shown in Fig. 6. The "Bakelite" or other damping material is cemented to the face of the crystal which is opposite to the face in contact with the piece being tested. The damping material should be of such nature that it does not transmit waves of the frequency being used, so that no reflection is received from the back face of the damping block.

Wherever in this specification, reference is made to supersonic waves, voltages, or vibrations, these shall be understood to be waves, voltages, or vibrations of fundamental frequencies in excess of the audible frequencies, that is, above about fifteen thousand cycles per second. In case a wave train consists of but one-half wave, it shall be considered supersonic if the period of the half wave is one thirty-thousandth of a second or less. An electro-mechanical transducer shall be understood to be a device for translating electrical currents or voltages into corresponding mechanical waves or vibrations, or vice versa; for example, the quartz crystal 3. Wherever the expression "wave train" or "voltage train" appears, it shall be understood to refer to a number of successive cycles of vibration or voltage, preceded and followed by essentially no vibration or voltage fluctuation; the number of cycles in a wave train may be any number from one half up to a large number; the total length of a wave train is usually less than the longest dimension of the part in which it travels. Wherever the word "part" is used, it shall refer to a bounded portion of solid, liquid or gas. Wherever the "sudden" discharge of a condenser is mentioned, it shall refer to a discharge occupying a time interval which is of the order of magnitude of, or shorter than, the period of one cycle of alternation of the oscillatory voltage produced by the voltage train generator.

Many variations of the equipment and method described above may be made without departing from the spirit of my invention. For instance, instead of using a single crystal to both send out and pick up the reflected wave trains, one crystal may be connected to the voltage train generator for sending out the waves, and a second crystal attached to the part, may be connected to the amplifier for detecting the reflected wave trains, as shown in my Patent No. 2,280,226.

Having now described the invention so that others skilled in the art may clearly understand the same, what it is desired to secure by Letters Patent is as follows:

1. A voltage train generating means comprising a condenser, means for charging said condenser, means for suddenly discharging said condenser, an oscillatory circuit connected in parallel with said condenser, and a pair of output terminals connected to said oscillatory circuit.

2. A voltage train generating means comprising a condenser, means for charging said condenser, means for suddenly discharging said condenser, a second condenser and an inductance connected in series and comprising two elements of an oscillatory circuit connected in parallel with said first mentioned condenser, and a pair of output terminals connected across one of said elements.

3. A voltage train generating means comprising a condenser, means for charging said condenser, means for suddenly discharging said condenser including a grid controlled discharge tube having its plate and its cathode connected respectively to the two terminals of said condenser, an oscillatory circuit connected in parallel to said condenser, and a pair of output terminals connected to said oscillatory circuit.

4. A voltage train generator comprising a condenser, means for charging said condenser, means for suddenly discharging said condenser including a grid controlled discharge tube having its plate and cathode respectively connected to the terminals of said condenser, an oscillatory circuit connected in parallel with said condenser and having as elements thereof a second condenser and an inductance connected in series, and a pair of output terminals connected across one of said elements.

5. A voltage train generating means comprising a condenser, means for charging said condenser, a grid controlled discharge tube having its plate and cathode respectively connected to the two terminals of said condenser, means normally rendering said tube non-conductive and means periodically temporarily rendering said tube conductive for suddenly discharging said condenser, an oscillatory circuit connected in parallel with said condenser and a pair of output terminals connected to said oscillatory circuit.

6. A voltage train generating means as described in claim 5 in which the oscillatory circuit includes a condenser and an inductance connected in series and forming two elements of said circuit and in which the output terminals are connected across one of said elements.

7. A voltage train generator comprising a condenser, means for charging said condenser, a grid controlled discharge tube having its plate connected to one terminal of said condenser and its cathode connected through a resistor to the other terminal of said condenser, an oscillatory circuit connected in parallel with said resistor, a pair of output terminals connected to said oscillatory circuit, and means for periodically discharging said condenser through said tube.

8. A voltage train generator as defined in claim 7 in which a second condenser and an inductance connected in series form two elements of the oscillatory circuit and the output terminals are connected across one of said elements.

9. In a voltage train generator, means for producing a damped oscillating voltage train including means for starting said train, and means for cutting off said train after a selected number of oscillations, comprising a grid controlled discharge tube connected with the output terminals of said generator for controlling said voltage train and a time delay circuit actuated by said starting means for controlling said discharge tube.

10. A device as defined in claim 9 in which the grid controlled discharge tube has its plate and cathode connected respectively to said output terminals.

11. A voltage train generator as defined in claim 1 including a grid controlled discharge tube having its plate and cathode connected respectively to said pair of output terminals and a time delay circuit actuated by said condenser and connected to the grid of said tube.

12. A voltage train generating means as defined in claim 3 including a second grid controlled discharge tube having its plate and cathode connected respectively to the said pair of output terminals and a time delay circuit actuated by the discharge of said condenser and connected to the grid of said second tube.

13. A voltage train generator as defined in claim 4 including a second grid controlled discharge tube having its plate and cathode connected respectively to the said pair of output terminals and a time delay circuit actuated by the discharge of said condenser and connected to the grid of said second tube.

14. A voltage train generating means as defined in claim 5 including a second grid control discharge whose plate and cathode are connected respectively to said pair of output terminals and a time delay circuit actuated by the discharge of said condenser and connected to the grid of said second grid controlled discharge tube to render said second tube temporarily conductive a selected time after the discharge of said condenser and stop the oscillation in said oscillating circuit.

15. A voltage train generator as found in claim 7 including a second grid controlled discharge tube whose plate and cathode are connected respectively to said pair of output terminals and a time delay circuit actuated by the discharge of said condenser and connected to the grid of said second tube.

16. In a device for the inspection or measurement of a part by means of supersonic vibration waves having means for producing a supersonic voltage train and an electromechanical transducer actuated by said voltage train producing means and having its sensitive area in effective contact with said part so as to radiate vibration wave trains into said part and generate voltage trains in response to wave trains reflected within said part; a heterodyne amplifier actuated by said transducer and having an intermediate frequency higher than the frequency of the alternations produced by said voltage train producing means and means actuated by said amplifier for indicating the time intervals between the voltage trains.

17. A device as claimed in claim 16 in which the voltage train producing means comprises a condenser, means for charging said condenser, means for suddenly discharging said condenser, an oscillatory circuit connected in parallel with said condenser, and a pair of output terminals for connecting said circuit with said electromechanical transducer.

18. A device as claimed in claim 16 in which the means for producing the voltage train comprises a condenser, means for charging said condenser, means for suddenly discharging said condenser including a grid controlled discharge tube having its plate and cathode respectively connected to the terminals of said condenser, an oscillatory circuit coupled to said condenser and having as elements thereof a second condenser and an inductance connected in series, and a pair of output terminals connected across one of said elements, and with said electromechanical transducer.

19. Means for sending vibration waves of a selected frequency into a part, comprising a quartz plate having one principal surface in effective contact with said part, means for absorbing vibrations of said selected frequency in effective contact with the other principal surface of said quartz plate, and means for applying voltage trains to said quartz plate to cause said plate to radiate vibration waves of said selected frequency.

20. In a device, for the inspection or measurement of a part by means of vibration waves and having means for producing a voltage train and having an electromechanical transducer actuated by said voltage train producing means and having two sensitive surfaces, one of which is in effective contact with said part so as to radiate vibration wave trains into said part and generate voltage trains in response to wave trains reflected within said part; means in effective contact with the other sensitive surface of said transducer for effectively absorbing waves of the frequency of the waves radiated by said transducer, a heterodyne amplifier actuated by said transducer and having an intermediate frequency higher than the frequency of the alternation produced by said voltage train producing means, and indicating means actuated by said amplifier.

21. In a device for the inspection or measurement of a part by means of vibration waves, in combination, means including an oscillatory circuit for producing a voltage train, means for limiting said train to a selected number of oscillations including a grid controlled discharge tube having its plate and cathode connected to said oscillatory circuit and a time delay circuit actuated by said voltage train producing means and connected to the grid of said tube, an electromechanical transducer actuated by said voltage train producing means and having two sensitive surfaces connected to said oscillatory circuit, one of which is in effective contact with said part so as to radiate vibration wave trains into said part and generate voltage trains in response to wave trains reflected within said part, means in effective contact with the other sensitive surface of said mechanical transducer for absorbing vibration of the frequency radiated by said transducer, an amplifier connected to said sensitive surface of said transducer, and means actuated by said amplifier for indicating the time interval between the voltage trains.

22. A device as defined in claim 21 in which the amplifier includes a heterodyne amplifier having an intermediate frequency higher than the frequency of the alternations produced by said voltage train producing means.

23. A device as defined in claim 21 in which the voltage train producing means comprises a condenser, means for charging said condenser, and means for suddenly discharging said condenser, said oscillatory circuit being coupled to said condenser.

24. A device as defined in claim 21 in which the means for producing a voltage train comprises a condenser, means for charging said condenser, means for suddenly discharging said condenser, said oscillatory circuit being connected in parallel with said condenser, and in which the amplifier comprises a heterodyne amplifier having an intermediate frequency higher than the frequency of the alternations produced by said voltage train producing means.

25. In an apparatus for inspecting materials, a pick-up responsive to supersonic mechanical vibrations for receiving supersonic vibration wave trains having a frequency which is selected in accordance with the character of the material being inspected, said pick-up being effective to generate voltage trains corresponding in frequency to said vibration wave trains, an oscillator for generating an oscillating voltage having a frequency different from the frequency of said voltage trains, a frequency converter for combining said voltage trains and said oscillating voltage to create converted voltage trains having a frequency higher than the frequency of the voltage trains generated by said pick-up, a band-pass amplifier responsive to the frequency of said converted voltage trains, and means connected to said band-pass amplifier for indicating a characteristic of said converted voltage trains.

26. The combination of claim 25, in which said pick-up is a piezoelectric crystal having means associated therewith for damping the free vibrations of said crystal.

27. A voltage train generator comprising, a first condenser of relatively large capacity, means including a resistor for relatively slowly charging said condenser, a gas tube having a cathode and an anode respectively connected with the plates of said condenser, said tube also having a control grid, an oscillating voltage source connected to said grid for rendering said tube periodically conductive to periodically relatively quickly discharge said condenser, an oscillatory circuit including a second condenser of relatively small capacity connected to said first condenser, whereby oscillations having substantially the frequency of the oscillatory circuit are produced therein, and means for applying said last named oscillations to a load circuit.

28. A voltage train generating means comprising a condenser, means for charging said condenser, means for suddenly discharging said condenser, an oscillatory circuit coupled to said condenser, whereby oscillations having substantially the frequency of the oscillatory circuit are produced therein, means for controlling the persistence of the oscillations in said oscillatory circuit, and means for applying said oscillations to a load circuit.

29. In combination, an electromechanical transducer adapted to be placed in mechanical contact with a material to be tested, means providing a source of relatively high voltage trains at a predetermined frequency for electrically energizing said transducer to produce vibrations in said material, and means comprising a heterodyne amplifier for amplifying relatively low voltage trains generated by said transducer in response to said vibrations in the intervals immediately following said high voltage trains, said heterodyne amplifier being connected to both said voltage source and said transducer and having an intermediate frequency which is higher than said predetermined frequency, and indicating means connected to the output of said amplifier.

30. A device for the inspection or measurement of a part by means of supersonic vibration waves comprising, means for periodically producing voltage trains, an electromechanical transducer actuated by said voltage train producing means and adapted to radiate supersonic vibration wave trains into said part and generate voltage trains in response to wave trains reflected within said part, means including a time delay circuit for excluding from the transducer that portion of each of said voltage trains following a predetermined number of cycles thereof, an amplifier actuated by said transducer, and indicating means actuated by said amplifier.

31. A device according to claim 30, in which said voltage train producing means includes means for synchronizing the individual waves of the voltage trains with their amplitude envelopes.

32. Means for sending vibration waves of a selected frequency into a part, comprising a piezoelectric crystal having one principal surface in effective contact with said part, means for absorbing vibrations of said selected frequency in effective contact with the piezoelectric crystal, and means for applying voltage trains to said piezoelectric crystal to cause said crystal to radiate vibration waves of said selected frequency.

FLOYD A. FIRESTONE.